(12) United States Patent
Fernando et al.

(10) Patent No.: US 10,860,606 B2
(45) Date of Patent: *Dec. 8, 2020

(54) EFFICIENTLY DELETING DATA FROM OBJECTS IN A MULTI TENANT DATABASE SYSTEM

(71) Applicant: salesforce.com, inc., San Francisco, CA (US)

(72) Inventors: Jan Asita Fernando, San Francisco, CA (US); Cody Marcel, Denver, CO (US); Sahil Ramrakhyani, San Jose, CA (US); Samarpan Jain, Fremont, CA (US); Brian Esserlieu, Walnut Creek, CA (US); James Ferguson, San Francisco, CA (US); Saikiran Perumala, Castro Valley, CA (US); Charles Fineman, Berkeley, CA (US); Jay Hurst, San Francisco, CA (US); Seshank Kalvala, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 324 days.

This patent is subject to a terminal disclaimer.

(21) Appl. No.: 15/884,944

(22) Filed: Jan. 31, 2018

(65) Prior Publication Data
US 2019/0236198 A1    Aug. 1, 2019

(51) Int. Cl.
*G06F 3/06* (2006.01)
*G06F 16/16* (2019.01)
(Continued)

(52) U.S. Cl.
CPC ............ *G06F 16/27* (2019.01); *G06F 3/0652* (2013.01); *G06F 16/162* (2019.01); *G06F 16/23* (2019.01); *G06F 16/25* (2019.01); *H04L 41/0273* (2013.01)

(58) Field of Classification Search
CPC ........ G06F 16/27; G06F 16/162; G06F 16/25; G06F 16/23; G06F 3/0652; G06F 3/0605;
(Continued)

(56) References Cited

U.S. PATENT DOCUMENTS 5,577,188 A    11/1996    Zhu
5,608,872 A    3/1997    Schwartz
(Continued)

OTHER PUBLICATIONS

U.S. Appl. No. 13/986,251, filed Apr. 16, 2013.

*Primary Examiner* — Jorge A Casanova
(74) *Attorney, Agent, or Firm* — Dergosits & Noah LLP; Todd A. Noah

(57) ABSTRACT

Disclosed are examples of systems, apparatus, methods and computer program products for deleting data of an object within a multi-tenant database. Described is a mechanism for performing operations such as an efficient delete operation by introducing a new delete operation (or method) that is configured to allow a data structure such as an object to identify one or more records to be deleted. In order to ensure that the operation is efficient, the mechanism may perform a validation of the values provided to the delete operation based on the type of data store used for storing the records. For example, the validation may ensure that the values provided to the method correspond to a composite primary key when records are stored in a non-relational data store. Upon a successful validation, an initial delete request may be translated to an appropriate delete operation for the underlying database.

20 Claims, 7 Drawing Sheets

(51) Int. Cl.
*G06F 16/23* (2019.01)
*G06F 16/25* (2019.01)
*G06F 16/27* (2019.01)
*H04L 12/24* (2006.01)

(58) Field of Classification Search
CPC ...... G06F 3/067; G06F 16/213; G06F 16/273; G06F 16/275; G06F 16/278; H04L 41/0273; H04L 41/024
See application file for complete search history.

(56) References Cited

U.S. PATENT DOCUMENTS

| | | | |
|---|---|---|---|
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,758 B1* | 8/2013 | McHugh | G06F 3/0619 711/100 |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 9,912,752 B1* | 3/2018 | Davis | H04L 67/1097 |
| 10,089,690 B1* | 10/2018 | Radha | G06F 16/2228 |
| 10,095,764 B2* | 10/2018 | Park | G06F 16/273 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2012/0233137 A1 | 9/2012 | Jakobson et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0040294 A1* | 2/2014 | An | G06F 16/24 707/756 |
| 2014/0359537 A1 | 12/2014 | Jakobson et al. | |
| 2015/0007050 A1 | 1/2015 | Jakobson et al. | |

(56) References Cited

U.S. PATENT DOCUMENTS

| | | |
|---|---|---|
| 2015/0095162 A1 | 4/2015 | Jakobson et al. |
| 2015/0172563 A1 | 6/2015 | Jakobson et al. |
| 2017/0060886 A1 | 3/2017 | Adam et al. |
| 2019/0347046 A1 | 11/2019 | Baptist et al. |

\* cited by examiner

500

Receive a first request to delete data related to a first data object of a plurality of data objects associated with a first organization in a multi-tenant database, the first request identifying a data structure that specifies values for one or more fields of the first data object
501

Determine the type of data store storing the first data object
502

Validate the specified values for the one or more fields of the first data object
503

Translate the request to delete data to a delete operation, the delete operation using the specified values to identify one or more records of the first organization to be deleted
504

Initiate a delete of the identified one or more records of the first organization by executing the delete operation
505

Receive a second request to delete data related to a second data object of a plurality of data objects associated with a second organization in the multi-tenant database, the second request identifying a data structure that specifies values for one or more fields of the second data object
601

Determine the type of data store storing the second data object
602

Validate the specified values for one or more fields of the second object
603

Initiate a delete of the one or more records of the second organization
604

FIG. 6

EFFICIENTLY DELETING DATA FROM OBJECTS IN A MULTI TENANT DATABASE SYSTEM

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to non-relational database systems, and more specifically to providing the ability to delete data of objects within a multi-tenant non-relational database.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services.

As service providers grow (in terms of numbers of customers and/or amount of customer data), data retention and management becomes more complex. In some instances, regulations may require the ability to remove certain types of data such as personal data from a database. Cloud computing services, however, may store large amounts of data including billions of records in non-relational databases. For efficiency purposes, these databases may store data in various complex objects. Moreover, these objects may be tenant-specific. Moreover, certain objects that store large amounts of data are often intended to be immutable. Accordingly, deleting data at a granular level and in a tenant-specific manner is not a trivial process. Thus, efficient mechanisms for non-relational databases to delete data from objects that store vast amounts of information are continually needed.

BRIEF DESCRIPTION OF THE DRAWINGS

The included drawings are for illustrative purposes and serve only to provide examples of possible structures and operations for the disclosed inventive systems, apparatus, methods and computer program products for providing run-time querying of multi-tenant non-relational database objects. These drawings in no way limit any changes in form and detail that may be made by one skilled in the art without departing from the spirit and scope of the disclosed implementations.

FIG. 5 shows a flowchart of an example method for deleting data of an object using at least a primary key according to one or more implementations of the disclosure.

FIG. 6 shows a flowchart of an example method for deleting data of an object using at least a record identifier according to one or more implementations of the disclosure.

DETAILED DESCRIPTION

Figure 1:
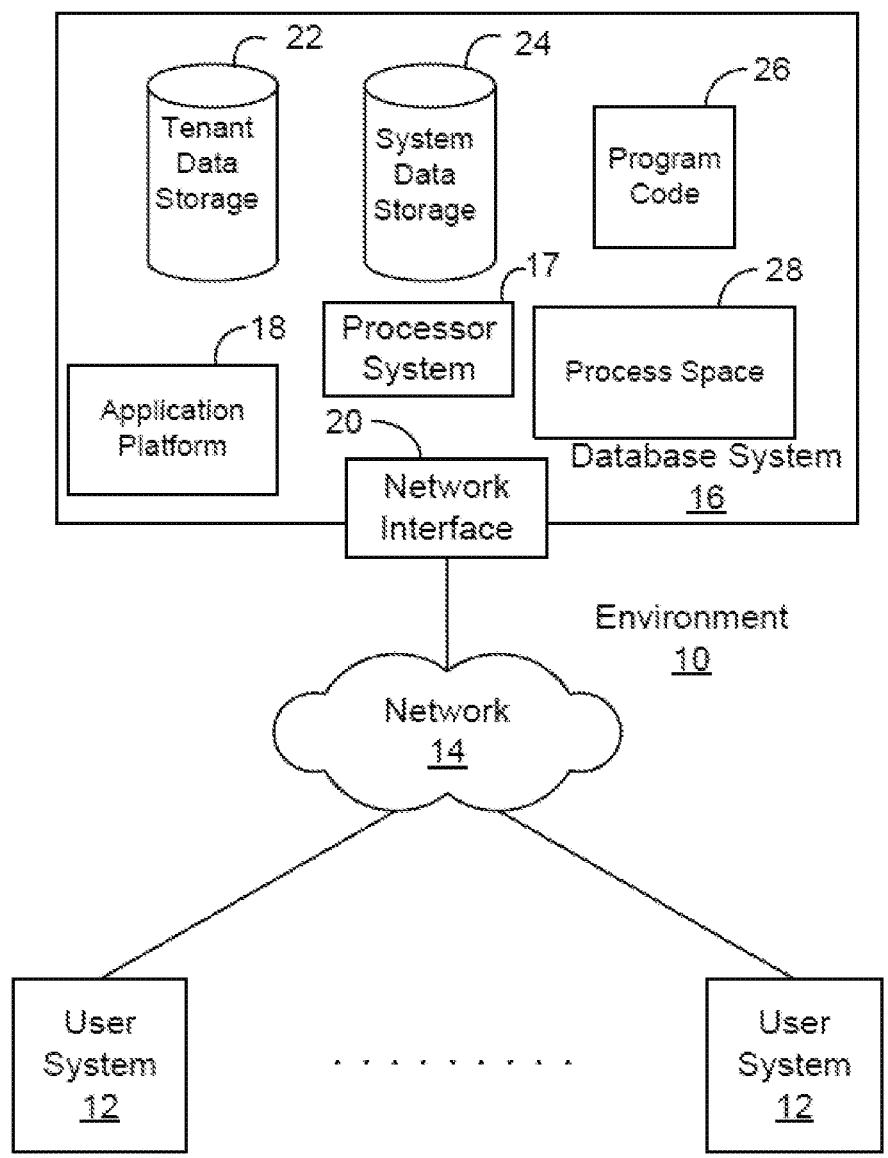
FIG. 1 shows a block diagram of an example environment in which on-demand database services may be provided according to one or more implementations of the disclosure.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated and may be performed in parallel. It should also be understood that the methods may include more or fewer operations than are indicated. In some implementations, operations described herein as separate operations may be combined. Conversely, what may be described herein as a single operation may be implemented in multiple operations.

Reference to "one implementation" or "an implementation" or "some implementations" means that a particular operation, feature, structure, or characteristic described in conjunction with the implementation can be included in at least one implementation. The appearances of the phrase "implementation" in various places in the specification do not necessarily all refer to the same implementation.

Some implementations of the disclosed systems, apparatus, methods and computer program products are configured to provide the ability to efficiently delete data related to objects in a multi-tenant database.

In order to store large amounts of data in the order of millions or billions of records, database systems often provide frameworks to store data using a non-relational data store. For example, the Salesforce platform provides a framework for a big object (or "BigObject"). A big object allows an organization to store a large volume of data (e.g. historical data) and access to the data can be controlled by simple accessibility rules (e.g. via the Metadata API from Salesforce). Data from such big objects may be removed from the system be deleting an entire object. However, there is a need to efficiently remove such data on a more granular level such as a removing individual records.

Accordingly, some implementations of the present disclosure provide an efficient mechanism for performing operations such as a delete operation for records of a data object within a multi-tenant database system. For example, the mechanism may introduce a new delete operation (e.g. method, function, call, class, verb, etc.) to one or more protocols or APIs (Application Programming Interface) used by an application platform of a database system. For example, some implementations may extend the capabilities of SOAP (Simple Object Access Protocol), REST (Representational state transfer), or an application platform specific programming language. In one implementation, the delete operation is configured to allow records to be identified by using a matching technique from information provided to the delete operation. For example, information may be provided in the form of a data structure such as an object that is passed as an argument to the delete operation. In one implementation, the information may specify values related to primary keys or unique record identifiers for the records to be deleted.

As described, the records may be part of large datasets (e.g. big objects), and accordingly, the mechanism may perform a validation to ensure that the records to be deleted may be identified (e.g. looked up, or queried) in an efficient manner. For example, the mechanism may determine (or estimate) whether the identification of records from the information provided satisfies certain performance requirements (e.g. number of records returned, time required to perform look up, etc.). In addition, the validation may consider the type or configuration of the database (or data store) storing the records to be deleted. For example, if the records are stored as part of a big object, the validation may ensure that the values provided to the delete operation correspond to a composite primary key, which provides an efficient identification when records are stored within a non-relational data store that are typically used for big objects. Upon a successful validation, the initial delete request may be translated into a database delete operation that is specific to the backend (or underlying) database. For example, the database delete operation may be invoked using procedures (e.g. protocol, API, etc.) provided by the database itself (e.g. HBase, Oracle, etc.). Accordingly, the mechanism provides users the ability to utilize uniform API protocols to provide an efficient mechanism to identify and delete individual records of potentially large datasets irrespective of the type of data store used to store the records.

As further described, implementations may be performed within an operating environment.

FIG. 1 shows a block diagram of an example of an environment 10 in which an on-demand database service exists and can be used in accordance with some implementations. Environment 10 may include user systems 12, network 14, database system 16, processor system 17, application platform 18, network interface 20, tenant data storage (or data store) 22, system data storage (or data store) 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 1 (and in more detail in FIG. 2) user systems 12 might interact via a network 14 with an on-demand database service, which is implemented in the example of FIG. 1 as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). A non-relational database management system (NRDBMS) or the equivalent may execute storage and fast retrieval of large sets of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 2:
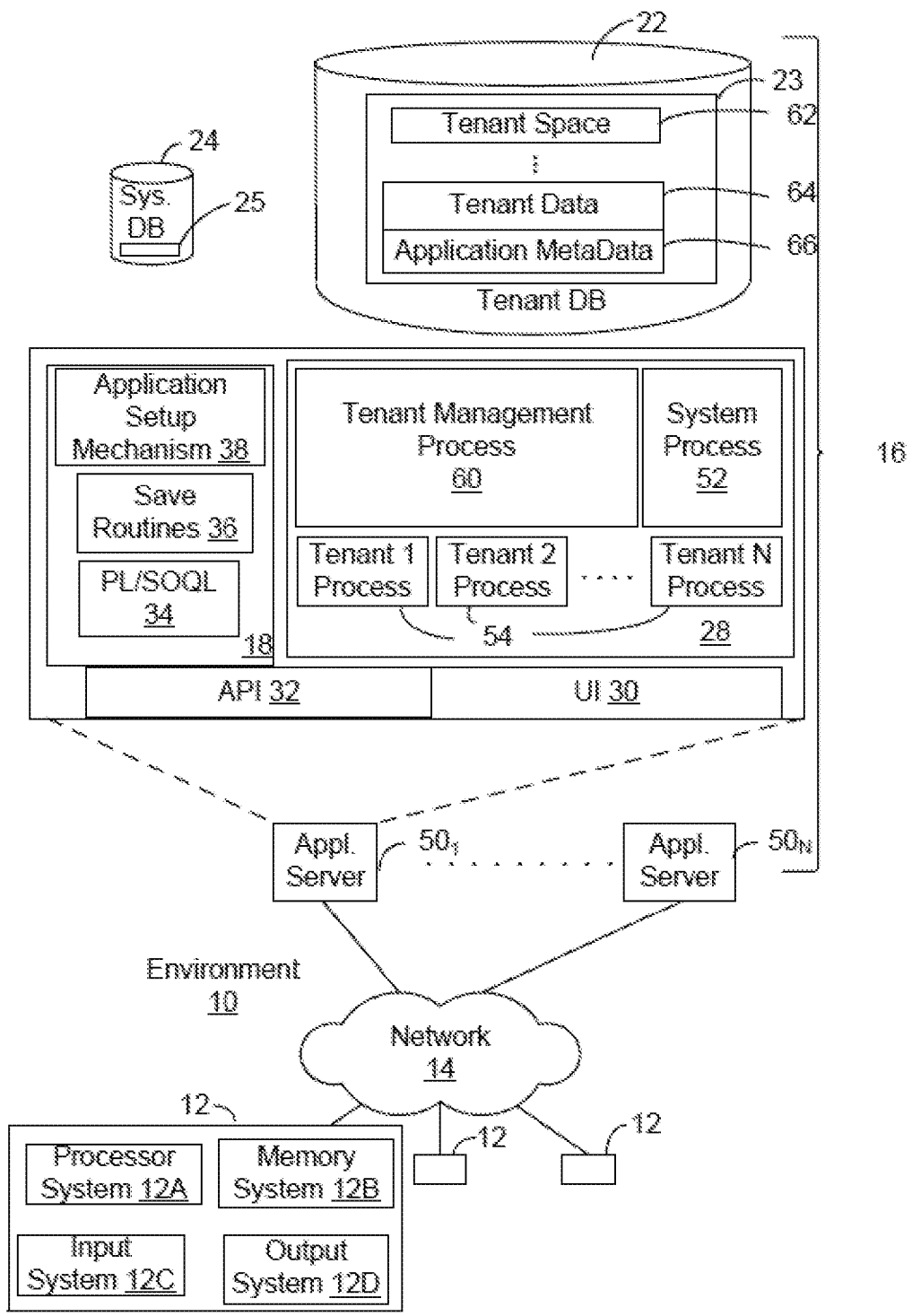
FIG. 2 shows a block diagram of example elements of FIG. 1 and various possible interconnections between these elements according to one or more implementations of the disclosure.

One arrangement for elements of system 16 is shown in FIGS. 1 and 2, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a personal computer, server, smart phone, or any wireless access protocol (WAP) enabled device or any other computing device capable of interfacing directly or indirectly to the Internet or other network connection. The term "computing device" is also referred to herein simply as a "computer". User system 12 may run an HTTP client, e.g., a browsing program or "browser", or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such a smart watch or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser. Similarly, system 16 (and additional instances of an MTS, where more than one is present) and all of its components might be operator configurable using applications using processor system 17, which include one or more processors. Non-transitory computer-readable media as further described herein can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or any other type of computer-readable medium or device suitable for storing instructions and/or data. Additionally, the entire program code, or portions thereof, may be transmitted and downloaded from a source over a network connection. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 2 shows a block diagram of an example of some implementations of elements of FIG. 1 and various possible interconnections between these elements. That is, FIG. 2 also illustrates environment 10. However, in FIG. 2 elements of system 16 and various interconnections in some implementations are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers 501-50N, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® or HBase databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server 501 might be coupled via the network 14 (e.g., the Internet), another application server 50N-1 might be coupled via a direct network link, and another application server 50N might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, HBase® and the like without departing from the scope of the implementations claimed.

Figure 3:
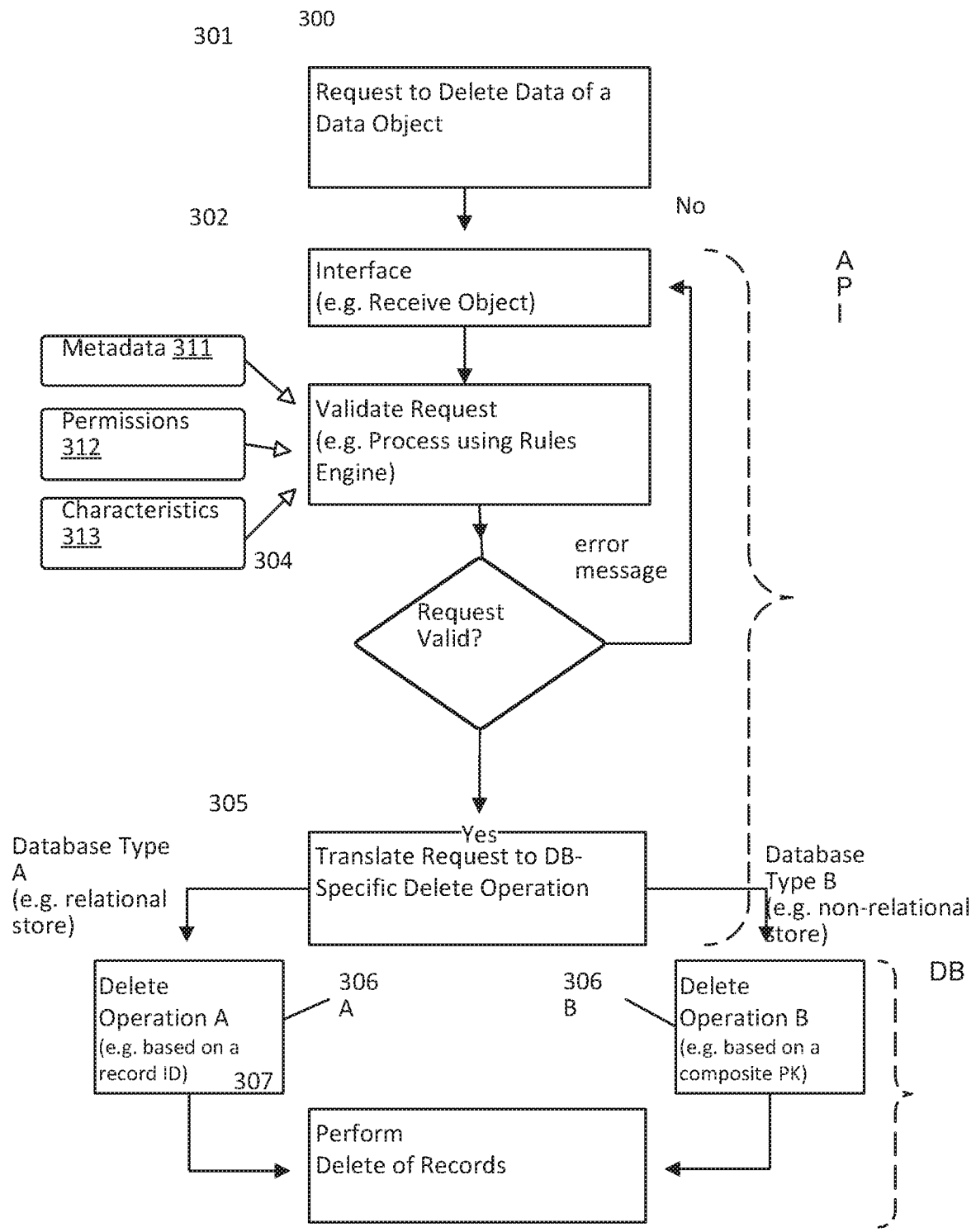
FIG. 3 shows a flow diagram of an example process for deleting data of an object within a multi-tenant database system according to one or more implementations of the disclosure.

FIG. 3 shows an example flow diagram of a process 300 for deleting data of an object within a multi-tenant database system in accordance with one or more implementations. Process 300 may use processing logic, which may include software, hardware, or a combination thereof. For example, process 300 may be performed using one or more components of system 10.

In 301, the system (e.g. database system 16) may receive a request from a client (e.g. user system 12) to delete data (e.g. one or more records) stored in an object that is associated with an organization. For example, a user may be required to remove certain data for a particular user account of an organization to comply with privacy regulations. For instance, the data may relate to data stored as part of an object (or custom object, or big object) within the database. As described, the database employed as part of the system may typically require the use of record IDs when performing various query operations (e.g. database delete operation). As described, the use of certain objects (e.g. big objects), however, may require identifying a composite primary key to efficiently identify records that are stored in a non-relational data store. The request may include a data structure that specifies values for one or more fields of the data object. Accordingly, the specified values may correspond to the composite primary key, for example, when deleting records related to a big object. The data structure may include any suitable structure for identifying the values. For example, the data structure may include providing the values as one or more fields of a data object as described. As another example, the values may be provided in another structured format such as an XML, JSON, or other suitable representation or file.

The request may be provided as part of an interaction with an interface of the system in 302. The interface may include an API (e.g. API 32) that allows a user (or developer) to interact with the system. In one embodiment, the API may be provided by an application platform. Accordingly, the request may utilize (or invoke) various components (or procedures, tools, classes, platform, etc.) provided by the API. The API may include API specific to the application platform or various other services such as SOAP, REST, and the like. For example, in some implementations, the request may include invoking an API operation (e.g. method, function, call, class, verb, etc.) such as a delete operation. In one implementation, the request includes invoking a delete operation and providing an object as an argument to the operation. Accordingly, the values may be provided as one or more fields of the provided object.

In one implementation, the delete operation, for example with SOAP, may include a "DeleteByExample(sObject[ ])" operation that requires an object (e.g. "sObject" from the Salesforce application platform) to be passed as an argument. Accordingly, in one implementation, when deleting data related to big objects, the sObject may require valid, non-null values for all fields that form the composite primary key. For other object (or entity) types, the sObject may require valid, non-null values for the ID field.

In one implementation, the request may include an object as a JSON or XML representation. For example, for a REST delete operation, an example curl call may include:
   https://*yourInstance*.salesforce.com/ . . . /collections/
      MyBigObject/-H "Authorization: Bearer token"-X
      DELETE.

Accordingly, the request body may be a JSON or XML representation of the sObject. For example, for a big object, all composite primary key fields may require valid, non-null values, and for all other object (or entity) types a non-null ID field.

Accordingly, both the SOAP and REST examples described above may use an object (e.g. as a composite primary key) as well as the ID field to identify records.

In some implementations, the object may identify exactly one record. In some implementations, however, the object may identify a group of records, for example, using a matching operation. Accordingly, some implementations described herein may be used for a single record delete, as well as a batch record delete. It should be noted that the above operation and objects names are merely examples and operations and objects that are configured in a similar manner are also contemplated.

In 303, the system may validate the request. The validation may account for the multi-tenant architecture of the system by performing a tenant-specific validation for requests received from multiple organizations. Accordingly, the validation may be performed using one or more rules. For example, the request may be processed using a rules engine. As described above, in order to identify the unique tenant records to be deleted, the validation may ensure that the request specifies values corresponding to the composite primary key defined for the object whose data is to be deleted and stored in a non-relational data store. As described above, the composite primary key defined for an object may be stored as metadata 311 associated with the object. Accordingly, the validation may include retrieving the appropriate metadata 311 to validate the specified delete criteria.

The validation may also consider one or more permissions 312. The permission can be based on various attributes and can be specific to a user, tenant, data, object, or a combination thereof. For example, the system may determine whether the requesting tenant (e.g. organization) has permission to delete the data specified in the request (e.g. per-tenant permission). As another example, the system may determine whether it is permissible to delete data that is related to a particular object such as a critical system object (e.g. per-object permission).

The validation may also consider certain characteristics 313 of the database. The characteristics 313 may include various static or runtime characteristics that are considered when potentially performing a delete operation. Accordingly, the characteristics 313 may be used to determine whether the request satisfies certain performance criteria. For example, the system may invalidate certain requests that may potentially exceed a predetermined resource limit (e.g. bandwidth, time, memory, processing requirements, etc.).

In addition, the characteristics may include the type or configuration (or architecture) of the data store storing the records. For example, in one implementation, the type of data store may include determining whether the data store is relational or non-relational. For example, in one implementation, upon determining records are stored in a non-relational data store, the data validation may ensure the values correspond to a composite primary key as described above; and upon determining records are stored in a relational data store, the data validation may ensure a provided record identifier (or ID) is valid.

In addition, the data store may be an external data store maintained by a customer (or other entity) and accessed via additional protocols or APIs (e.g. OData API from Salesforce). For example, the validation may consider the additional access time required for an external database when determining whether an operation satisfies performance requirements.

Accordingly, as described, the system may also combine one or more validation techniques. For example, the validation may be based on performing a matching with a partial composite primary key along with a performance analysis. For example, a validation may be successful based on partial keys if the look up of records to be deleted may be performed within a predetermined time.

In 304, the system may process the request based upon the result of the validation process in 303. For example, in response to an invalid request, the system may return an error message to the requesting user. Upon validating the request, the system may proceed to process the request.

In 305, the system may translate the request to a delete operation recognized by the backend database architecture. For example, an application platform (e.g. application platform 18) may interact with multiple database configurations (or types) as part of the system. Accordingly, in 306A/B, the system may translate the request to a database delete operation A/B that is specific to the database configuration employed for the object. As further described in FIG. 4, the database delete operation may be specific to the backend database configuration storing the relevant data. In one implementation, the delete operation utilizes an API provided by the database used to store the relevant data.

Accordingly, in one implementation, the initial request to delete data may utilize a first API provided by an application platform of the system (e.g. Salesforce) and the database delete operation may utilize a second API or operations provided by the underlying database (e.g. Oracle, HBase, etc.). Accordingly, in some implementations, the operations provided by the first API and the second API are different.

In 307, the system may perform a synchronous delete of the records specified in the initial request to delete data. For example, the system may initiate execution of the appropriate delete operation. As shown, in some implementations, the system may use various processing layers. For example, the request, validation, and translation (e.g. 301-306) may be performed by a platform application API of the system, and the delete operation and database update may be performed by the backend or underlying database and/or database API.

Figure 4:
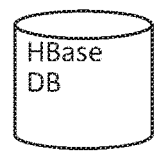
FIG. 4 shows a flow diagram of an example of processing a request to delete data of an object using a composite primary key for a non-relational data store according to one or more implementations of the disclosure.

FIG. 4 shows a flow diagram 400 of an example of processing a request to delete data of an object using a composite primary key according to one or more implementations of the disclosure. It should be noted that the particular database provider (e.g. HBase) as shown is merely an example and that the process may equally apply to other database providers.

As described above, a composite primary key may be defined for certain objects such as a big object. For example, an organization within a multi-tenant environment may define schema elements for a big object to include one or more fields relating to the big object within the database. The organization may also define one or more of those fields to be a composite primary key for the big object (e.g. via a script or interface). The system may then store the metadata information relating to the organization's object, generating a metadata model of the big object and its attributes including the composite primary key. The system may also write the metadata to new tables specific to the organization within an existing relational database. In some implementations, the composite key is a composite primary key. In some implementations, the composite key is a composite secondary key which is defined in addition to a composite primary key. In some implementations, a composite primary key and a composite secondary key can both consist of multiple fields and can both arrange data in a non-relational database such that it can be retrieved faster.

As shown, the system may receive a first request 401 from a first tenant (or organization) "tenant 1" and a second request 402 from a second tenant (or organization) "tenant 2." The first request 401 relates to a car object that includes a make, model, color, and year fields. As shown, the first request 401 invokes a delete operation (e.g. method), in this case, "DeleteByExample( )" that passes a new entity object as an argument for the operation. The object includes values for the make and model fields of the car object. As shown, the metadata for the car object indicates that the make and model form the composite primary key for the car object. Accordingly, because the request includes values for the make and model (i.e. values corresponding to the composite primary key for a car object) the first request 401 is deemed valid by the validation process 403. In contrast, the second request 402 includes only a value for the name field of the customer object, and as shown, the metadata for the customer object indicates that the name and SSN form the composite primary key. Accordingly, the second request 402 is deemed invalid by the validation process 403. As described above, the first request 401, which was valid, may be translated to a database delete operation specific to the underlying database (or database-specific delete operation), which in this case is HBase. Thus, as shown in 404, the translation of the request to the database delete operation provides an operation that is in a specific format used by HBase (e.g. Phoenix Query). Accordingly, in some implementations the specified values corresponding to the composite primary key for the data object substitute for one or more unique row identifiers for the one or more records to be deleted when executing the database delete operation. It should be noted that in some implementation, additional validation rules may be considered such as determining whether the identification of records satisfies performance requirements, for example, when partial keys are provided to the delete operation.

FIG. 5 shows a flowchart of an example of a method for deleting data of an object using at least a primary key within a multi-tenant database system according to one or more implementations. Method 500 may use processing logic, which may include software, hardware, or a combination thereof. For example, process 500 may by a system (e.g. database system 16).

As describe above, the system may maintain a multi-tenant non-relational database associated with a plurality of organizations. The multi-tenant non-relational database may identify a plurality of records and a plurality of data objects for each of the plurality of organizations, and the plurality of data objects may each have one or more fields.

In 501, the system may receive a first request (e.g. from a user system 12) to delete data related to a first data object of a plurality of data objects associated with a first organization (or first tenant) in a multi-tenant database. As described above, the request (e.g. request 401) may identify a data structure that specifies values for one or more fields of the data object. In one implementation, the data structure may include an object that is passed as an argument for an operation invoked as part of the request. For example, in one implementation, the request may invoke a delete operation (e.g. DeleteByExample( ) as described above) as part of a SOAP API. Accordingly, in such an example, the data object from which data is to be deleted may include a big object (or equivalent), and the object passed as an argument to a SOAP operation may include an sObject (or equivalent application platform specific object). As another example, in one implementation, the request may invoke a delete request using an object ending as part of a REST API. Accordingly, in such an example, the data object from which data is to be deleted may include a big object, and the body of the request may include representation of an object (e.g. as a JSON, XML, or any other suitable representation).

In 502, the system may determine the type of data store storing the first data object. For example, in one implementation, the system may determine the data related to the first data object is stored in a non-relational data store. For example, data related to a big object may be stored in a non-relational data store. Accordingly, a further described below, the validation may be performed based on such a determination.

In 503, the system may validate the specified values for one or more fields. In one implementation, the system may validate that the specified values for the one or more fields satisfy one or more performance requirements for identifying one or more records of the first data object. In addition, in one implementation, the system may validate that the specified values for the one or more fields correspond to at least a portion of a composite primary key defined for the data object. By ensuring the specified values correspond (at least partially) to the primary composite key, the system may ensure that the identification (or look up) of the records to be deleted may be performed efficiently. For example, the system may validate that the specified values satisfy one or more performance requirements (e.g. query time, bandwidth, etc.) for identifying the one or more records of the first data object.

In one implementation, the system may retrieve and use metadata associated with the data object to validate the specified fields. For example, the composite primary key may be defined during creation of the first data object and stored as metadata. In one implementation, if the system determines that the data is stored in a relational data store, the system may validate that the specified values correspond to valid records IDs as further described below in relation to FIG. 6.

In one implementation, the system may validate, using one or more permissions associated with the first organization, the first organization is authorized to delete data related to the first data object. In one implementation, the system may validate, using one or more permissions associated with the first data object, the first organization is authorized to access the data object.

In one implementation, the validating is performed on an API layer of the application platform of the multi-tenant database system and the database delete operation is performed by the database and initiated by the application platform.

In 504, the system may translate the first request to delete data to a database delete operation (e.g. delete operation as shown in 404 of FIG. 4). The database delete operation may use the specified values to identify one or more records of the first organization to be deleted. In one implementation, the translation may be performed in response to validating the values of the data structure correspond to a composite primary key of the data object. In one implementation, the system may determine, responsive to validating the one or more fields, a type of database used to store the data object. Accordingly, the delete operation may be translated based on the determined type of database.

In 505, the system may initiate, during runtime of the database, a delete of the identified one or more records of a tenant (or organization) by executing the database delete operation of 504. In one implementation, the multi-tenant environment can support synchronous real-time (or near real-time) deletions of records for objects including big objects.

FIG. 6 shows a flowchart of an example method for deleting data of an object using at least a record identifier within a multi-tenant database system according to one or more implementations of the disclosure. Method 600 may use processing logic, which may include software, hardware, or a combination thereof. For example, process 600 may by a system (e.g. database system 16).

In 601, the system may receive a second request to delete data related to a second data object of a plurality of data objects associated with a second organization in the multi-tenant database. The second request may identify a data structure that specifies values for one or more fields of the second data object. In 602, the system may determine the type of data store storing the second data object. In one implementation, the system may determine the data related to the second data object is stored in a relational data store. In 603, the system may validate the specified values for the one or more fields of the second object. In one implementation, the system may validate that the specified values correspond to one or more unique row identifiers (or row IDs) for one or more records of the second data object. In addition, in one implementation, the system may validate that the specified values for the one or more fields satisfy one or more performance requirements for identifying one or more records of the second data object. In 604, the system may initiate a synchronous delete of the one or more records of the second organization. It should be noted that method 600 may be performed by the system in conjunction with method 500. For example, the system may process the first request and second request in parallel.

Accordingly, the implementations described above provide an efficient mechanism to delete data related to objects in a multi-tenant database system.

Figure 7:
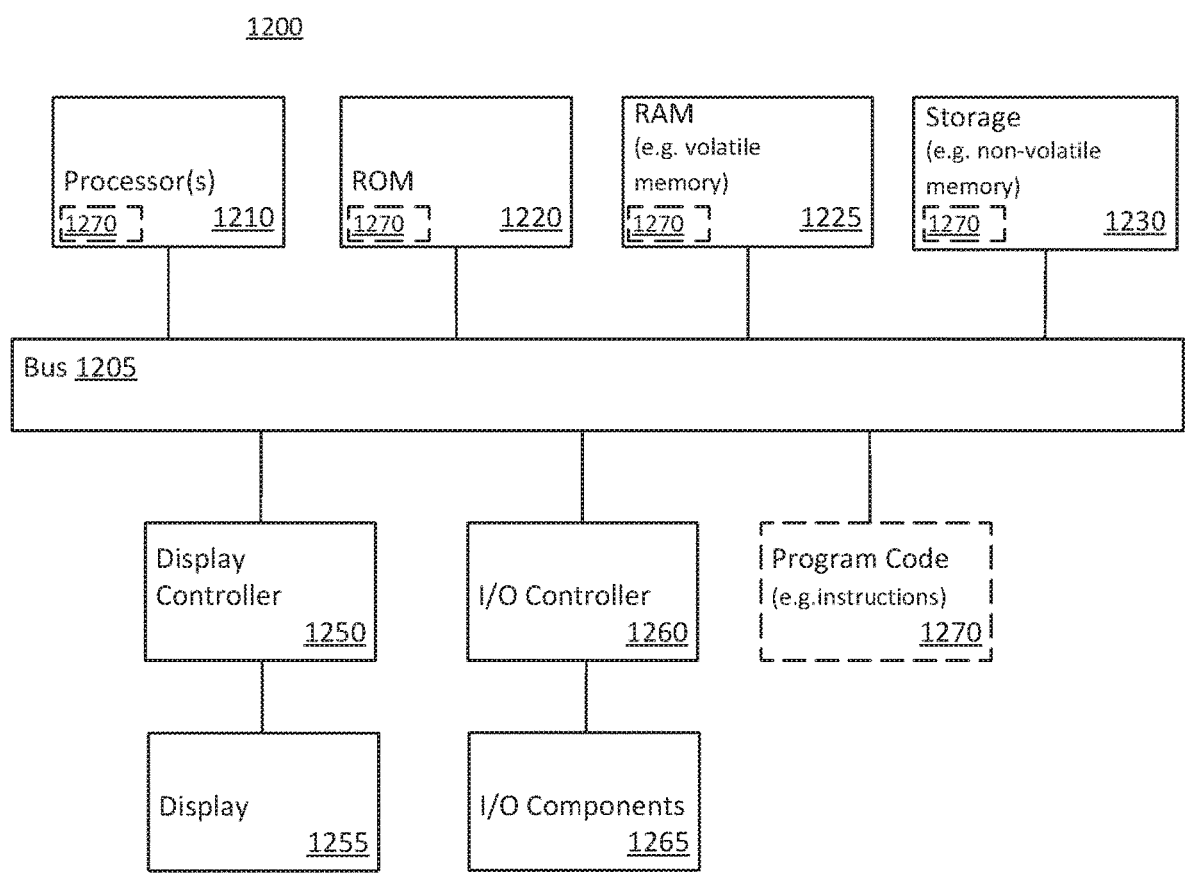
FIG. 7 shows a block diagram of an example computing system that may be used in conjunction with one or more implementations of the disclosure.

FIG. 7 shows a block diagram of an example computing system that may be used in conjunction with one or more implementations. For example, computing system 1200 (or system, or computing device, or device) may represent any of the devices or systems (e.g. database system 16) described herein that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor 1210, ROM (Read Only Memory) 1220, RAM (or volatile memory) 1225, and storage (or non-volatile memory) 1230. The processor 1210 may retrieve stored instructions from one or more of the memories 1220, 1225, and 1230 and execute the instructions to perform processes, operations, or methods described herein. These memories represent examples of a non-transitory computer-readable medium (or machine-readable medium) or storage containing instructions which when executed by a computing system (or a processor), cause the computing system (or processor) to perform operations, processes, or methods described herein. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Program code 1270 (or instructions, modules, components, units, functions, or logic) may represent any of the instructions, functions, or engines described above. Program code 1270 (e.g. program code 26) may reside, completely or at least partially, within the memories described above (e.g. non-transitory computer-readable media), or within a processor during execution thereof by the computing system. In addition, program code 1270 can be implemented as software, firmware, or functional circuitry within the computing system, or as combinations thereof.

Moreover, any of the disclosed implementations may be embodied in various types of hardware, software, firmware, and combinations thereof. For example, some techniques disclosed herein may be implemented, at least in part, by non-transitory computer-readable media that include program instructions, state information, etc., for performing various methods and operations described herein. Examples of program instructions include both machine code, such as produced by a compiler, and files containing higher-level code that may be executed by a computing device such as a server or other data processing apparatus using an interpreter. Computer-readable media encoded with the program instructions may be packaged with a compatible device or provided separately from other devices (e.g., via Internet download). Any such computer-readable medium may reside on or within a single computing device or an entire computer system, and may be among other computer-readable media within a system or network.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing specification, example implementations of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A system comprising:
   one or more processors; and
   a non-transitory computer readable medium storing a plurality of instructions, which when executed, cause the one or more processors to perform operations comprising:
   receiving a first request to delete data related to a first data object of a plurality of data objects associated with a first organization in a multi-tenant database system, the first request identifying a data structure that specifies values for one or more fields of the first data object;
   validating that the specified values for the one or more fields satisfy one or more performance requirements for identifying one or more records of the first data object;
   translating the first request to delete data to a database delete operation, the database delete operation using the specified values to identify one or more records of the first organization to be deleted; and
   initiating a synchronous delete of the identified one or more records of the first organization by executing the database delete operation.

2. The system of claim 1, the operations further comprising:
   validating, using metadata associated with the first data object, that the specified values for the one or more fields correspond to at least a portion of a composite primary key defined for the first data object.

3. The system of claim 1, the operations further comprising:
   determining the data related to the first data object is stored in a non-relational data store.

4. The system of claim 1, the operations further comprising:
   validating, using one or more permissions associated with the data object, that the first organization is authorized to access the data object.

5. The system of claim 1, wherein the first request invokes a delete operation of an application platform of the multi-tenant database system and the data structure comprises an object passed as an argument to the delete operation.

6. The system of claim 1, wherein the data structure includes only values for an entirety of the composite primary key.

7. The system of claim 1, wherein the specified values corresponding to the composite primary key for the first data object substitute for one or more unique row identifiers for the one or more records of the first organization to be deleted when executing the database delete operation.

8. The system of claim 1, the operation further comprising:
   receiving a second request to delete data related to a second data object of a plurality of data objects associated with a second organization in the multi-tenant database system, the second request identifying a data structure that specifies values for one or more fields of the second data object;
   validating that the specified values correspond to one or more unique row identifiers for one or more records of the second data object; and
   initiating a synchronous delete of the one or more records of the second organization.

9. The system of claim 1, wherein the validating is performed on an API layer of an application platform of the multi-tenant database system and the database delete operation is performed by the database and initiated by the application platform.

10. The system of claim 1, wherein the first request to delete data is received via a REST API, SOAP API, or an application platform specific programming language.

11. A method comprising:
    receiving, by a multi-tenant database system, a first request to delete data related to a first data object of a plurality of data objects associated with a first organization in the multi-tenant database system, the first request identifying a data structure that specifies values for one or more fields of the first data object;
    validating that the specified values for the one or more fields satisfy one or more performance requirements for identifying one or more records of the first data object;
    translating, by the multi-tenant database system, the first request to delete data to a database delete operation, the database delete operation using the specified values to identify one or more records of the first organization to be deleted; and
    initiating a synchronous delete of the identified one or more records of the first organization by executing the database delete operation.

12. The method of claim 11, further comprising:
    determining the data related to the data object is stored in a non-relational data store.

13. The method of claim 11, further comprising:
    validating, using metadata associated with the first data object, that the specified values for the one or more fields correspond to at least a portion of a composite primary key defined for the first data object.

14. The method of claim 11, wherein the first request invokes a delete operation of an application platform of the multi-tenant database system and the data structure comprises an object passed as an argument to the delete operation.

15. The method of claim 11, further comprising:
receiving a second request to delete data related to a second data object of a plurality of data objects associated with a second organization in the multi-tenant database system, the second request identifying a data structure that specifies values for one or more fields of the second data object;
validating that the specified values correspond to one or more unique row identifiers for one or more records of the second data object; and
initiating a synchronous delete of the one or more records of the second organization.

16. The method of claim 11, wherein the specified values corresponding to the composite primary key for the data object substitute for one or more unique row identifiers for the one or more records of the first organization to be deleted when executing the database delete operation.

17. A computer program product comprising computer-readable program code capable of being executed by one or more processors when retrieved from a non-transitory computer-readable medium, the program code including instructions to:
receive a first request to delete data related to a first data object of a plurality of data objects associated with a first organization in a multi-tenant database system, the request identifying a data structure that specifies values for one or more fields of the first data object;
validate that the specified values for the one or more fields satisfy one or more performance requirements for identifying one or more records of the first data object;
translate the request to delete data to a database delete operation, the database delete operation using the specified values to identify one or more records of the first organization to be deleted; and
initiate a synchronous delete of the identified one or more records of the first organization by executing the database delete operation.

18. The computer program product of claim 17, the program code comprising further instructions to:
determine the data related to the data object is stored in a non-relational data store.

19. The computer program product of claim 17, the program code comprising further instructions to:
validate, using metadata associated with the first data object, that the one or more fields of the specified values correspond to at least a portion of a composite primary key defined for the data object.

20. The computer program product of claim 17, the program code comprising further instructions to:
receive a second request to delete data related to a second data object of a plurality of data objects associated with a second organization in the multi-tenant database system, the second request identifying a data structure that specifies values for one or more fields of the second data object;
determine the data related to the second data object is stored in a relational data store;
validate that the specified values correspond to one or more unique row identifiers for one or more records of the second data object; and
initiate a synchronous delete of the one or more records of the second organization.

* * * * *